United States Patent [19]

Underwood

[11] Patent Number: 4,959,232

[45] Date of Patent: Sep. 25, 1990

[54] PROCESS FOR MAKING LIQUID SMOKE COMPOSITIONS AND RESIN TREATED LIQUID SMOKE COMPOSITIONS

[75] Inventor: Gary Underwood, Manitowoc, Wis.

[73] Assignee: Red Arrow Products Company, Inc., Manitowoc, Wis.

[21] Appl. No.: 343,928

[22] Filed: Apr. 26, 1989

[51] Int. Cl.$^5$ ............................................. A23L 1/221
[52] U.S. Cl. ................................... 426/271; 426/314; 426/490; 426/650
[58] Field of Search ............... 426/271, 490, 650, 314; 210/660, 661

[56] References Cited

U.S. PATENT DOCUMENTS

| | | | |
|---|---|---|---|
| 3,106,473 | 10/1963 | Hollenbeck | 99/229 |
| 3,531,463 | 9/1970 | Gustafson | 260/211.5 |
| 4,224,415 | 9/1980 | Meitzner et al. | 521/38 |
| 4,297,220 | 10/1981 | Meitzner et al. | 210/690 |
| 4,359,481 | 11/1982 | Smits et al. | 426/533 |
| 4,431,032 | 2/1984 | Nicholson | 138/118.1 |
| 4,431,033 | 2/1984 | Nicholson | 138/118.1 |
| 4,496,595 | 1/1985 | Nicholson | 426/284 |
| 4,504,507 | 3/1985 | Nicholson | 426/533 |
| 4,551,339 | 11/1985 | Olson | 426/314 |

FOREIGN PATENT DOCUMENTS

WO88/00935 2/1988 PCT Int'l Appl. .

OTHER PUBLICATIONS

Shaw, P., et al., J. Agric. Food Chem., 37: pp. 14–18, (1989).

Fox, C., Hydrocarbon Processing, Nov. 1978.

*Primary Examiner*—Carolyn Paden
*Attorney, Agent, or Firm*—Marshall, O'Toole, Gerstein, Murray & Bicknell

[57] ABSTRACT

The present invention relates to high browning, reduced phenol and basic constituent liquid smoke compositions and a process to make these compositions. These compositions are useful for coloring and flavoring edible foodstuffs.

19 Claims, No Drawings

PROCESS FOR MAKING LIQUID SMOKE COMPOSITIONS AND RESIN TREATED LIQUID SMOKE COMPOSITIONS

FIELD OF THE INVENTION

The present invention relates to a process to make liquid smoke compositions from wood smoke which is refined to preferentially remove selected undesirable condensable smoke components. These liquid smoke compositions are used to color and flavor edible foodstuffs.

BACKGROUND OF THE INVENTION

Use of liquid smoke solutions as a replacement for smoking food by direct contact with wood smoke has become a standard industry practice. When applied to the surface of meats and other proteinaceous foodstuffs, liquid smoke will give an item a characteristic smoke flavor and produce a dark smoked color. The achievement of a smokehouse like product by application of an aqueous smoke solution to food requires the control and balancing of many related variables such as the food composition, temperature, humidity, processing and contact time, amount and concentration of smoke applied.

For example, when applying current aqueous smoke to meats the processor must compromise the smoke color of the product to keep the flavor at a desired level because the flavor imparting ability of known compositions is too intense at a given color. There is a need in the industry for an aqueous smoke solution with good coloring properties but with less intense flavoring ability.

Wood smoke is a complex and variable mixture of chemicals produced during pyrolysis and includes vaporous compounds which are normally liquid at room temperature. Pyrolysis is a general term for the thermal decomposition of any organic material such as wood, plants, and fossil fuels, which occurs either during combustion or in the absence of combustion. Combustion uses the oxidation or burning of a portion of the organic matter to provide the thermal energy required to vaporize and decompose the remainder. For pyrolysis without combustion, thermal energy must be supplied indirectly from some other source, such as radiation, solid or gaseous heat carriers, or thermal conduction through reactor walls. The energy vaporizes and decomposes the organic matter without burning the organic matter directly.

Either method of pyrolysis produces condensable liquids, non-condensable gases and solids in varying proportions depending upon reaction conditions. The condensable liquids can be further subdivided into water soluble organics and water insoluble tars. It is known that the desirable active ingredients for flavoring foodstuffs are among the water soluble condensable liquids.

While there are hundreds of different chemical species present in liquid smoke, liquid smoke components are generally divided into classes based on chemicals with distinct functional groups. These classes are acids, carbonyls, phenols, and basic and neutral constituents. In general, phenols are the primary flavoring compounds, carbonyls are mainly responsible for coloration and acids are principally preservatives and pH controlling agents. Acids and carbonyls also make a secondary contribution to flavor and enhance the surface characteristics of smoked meat products.

Both the color and flavor chemistry of liquid smoke compositions is highly complex as evidenced by the over four hundred compounds identified as constituents of these compositions. A summary of the many constituents found in liquid smoke is listed by Maga in "Smoke in Food Processing" CRC Press, pp. 61-68 (1968). A majority of researchers skilled in the art of smoke solutions have concluded that phenols are the important contributors to smoke aroma and flavor, however, minor amounts of certain types of compounds may significantly impact both the color and flavor chemistries of a particular composition.

For example, a representative commercially available smoke flavoring with a titratable acidity level of about 11% contains about 13% carbonyls, 1.5% phenols and at least 70% water. The remaining constituents, about 4.5% of the total mass balance of the smoke, include basic and neutral organic compounds. Reductions of both phenols and basic constituents by the process of this invention gives improved aqueous smoke solutions.

A reduction of the total phenolic component of an aqueous smoke mixture may produce a less flavorful smoke solution but still retain desirable coloring properties. Phenolic reduction gives a less flavorful smoke solution, however, even a solution with a significant weight reduction of phenols still retains substantial flavoring components. In addition, a reduction in selective basic constituents also gives an improved, less intensely flavored solution.

Where surface coloring is important, a measure of active carbonyls in a solution may determine the quantity of liquid smoke required. The active carbonyls initially react with the available amino groups on surface proteins of foodstuff. Subsequent reactions occurring under drying and heating conditions lead to formation of the characteristic brown smoked color The concentration of a specific carbonyl, hydroxyacetaldehyde, is also a good indicator of the color forming potential of liquid smoke.

A further measurement that is used to characterize liquid smoke is the browning index defined according to procedures described below. The browning index is used in the smoke flavoring industry to measure the browning performance of a liquid.

In commercially produced aqueous smoke solutions, production begins with smoke made by pyrolysis and limited combustion of wood which is subsequently collected in recirculating water columns. A typical commercial liquid smoke preparation for surface applications is the aqueous smoke flavoring described in U.S. Pat. No. 3,106,473 to Hollenbeck. The dilution of the condensable smoke components in water results in the removal of undesired tars and water insoluble components, however, further refinement of the solution is needed for the flavoring and coloring applications described above.

A number of methods to reduce the concentration of flavor producing phenols are disclosed in the art. One method uses liquid-liquid extraction with vegetable oils as described in U.S. Pat. No. 3,480,446 to Hollenbeck. With this method total phenolics can be reduced by about 55% using repeated extraction. The '446 patent, however, does not teach browning foodstuffs with the disclosed smoke flavored oils and the oil extraction process is not selective, desired as well as undesired components are removed by the process.

U.S. Pat. No. 4,431,033 to Nicholson teaches liquid-liquid extraction of aqueous smoke solutions with solvents which are immiscible in the aqueous solution. The .033 patent specifies that the solvent hydrogen bonding solubility parameter must be at least 2.7. The resulting extracted solution is described as tar depleted. While tar reduction is the object of the .033 patent, the total phenolics concentration is also reduced. The major shortcomings of the process include a high level of solvent retention and the extraction of desired as well as undesired components from the smoke solution.

SUMMARY OF THE INVENTION

This invention encompasses a high browning, mild flavored reduced phenol and basic constituent liquid smoke composition, and a process for making a high browning, reduced phenol and basic constituent liquid smoke composition, comprising contacting an aqueous liquid smoke solution having a soluble organics concentration of about 4 to about 40 brix with both polymeric nonionic and ionic resins to give a composition having a reduced phenol and basic constituent content.

This process reduces the phenol and basic constituent concentration while maintaining the ability of liquid smoke compositions to impart smoked color to meats and other foodstuffs.

The products obtained using this process have an improved liquid smoke flavor. The improved flavor is due to selective removal of harsh oily tasting phenolic compounds and musty, earthy, basic compounds which are derived from the pyrolysis of wood.

DETAILED DESCRIPTION OF THE INVENTION

The present invention relates to a process of treating aqueous smoke solutions with nonionic resins to produce a much lower phenol content and treating the solutions with ionic resins to produce a lower basic component content. The resin treated liquid smoke compositions still contain sufficient quantities of reactive carbonyls to produce the desired smoked color and appearance when properly applied to the surface of meats. However, the resin treated solutions have a milder smoke flavor and are preferred by taste panels to untreated aqueous smoke solutions. Typically, the phenols content is reduced by about 10 to 90 weight percent and the basic constituents are reduced by an amount effective to remove the musty and earthy aromas present when the pH of the solution is comparable to the pH of meat.

Further, the liquid smoke compositions of the present invention contain essentially no, or very low concentrations of, organic solvents which may be used to condition or regenerate the resin In this application, essentially none or extremely low concentrations means less than about one percent by weight and preferably less than 0.5 percent by weight of organic solvents.

The aqueous smoke solutions which can be used as starting materials in the process will generally be in a range of about 4 to 40 brix and preferably in a range of about 5 to 30 brix. Brix is an indication of the percentage of soluble organics in solution. While normally used in measuring sugar solutions, a brix value or number is an effective approximation of the non-water smoke components in an aqueous smoke composition or solution. The usual limit of brix beyond which polycyclic aromatic hydrocarbons, harsh flavored phenolics and tars become soluble in aqueous solutions of smoke during production from vaporous smoke is about 30 brix.

It has been found that nonionic and ionic resins are effective in removing phenolics from solutions up to about 40 brix. Above this limit, the solvating effect of the organics in solution begins to overcome the ability of the resins to remove phenols. The usual limit of about 30 brix in smoke solutions produced by aqueous extraction of vaporous smoke can be exceeded, if desired, for efficiency or other reasons. The nonionic resin would then be required to reduce the overall content of polycyclic aromatic hydrocarbons, tars and phenolics. Above 40 brix, as found in concentrates of more dilute products made by evaporation, freeze concentration or other means, nonionic resins are of little or no use in removing phenols.

One skilled in the art would readily recognize there are different ways to contact the nonionic and ionic resins with the aqueous smoke solutions. Both batch and flow processes are acceptable methods The preferred method of treatment of aqueous smoke solutions to produce the compositions of the instant invention is to sequentially pass a smoke solution downwardly through first and second columns of a suitable nonionic and ionic resins. In this way, the maximum amount of solution may be treated with a given amount of resin before regeneration, due to adsorption of undesired components, is required. A downflow water rinse may be employed before regeneration in order to maximize product yield.

Treatment with both nonionic and ionic resins decreases the brix of the treated solutions due to some solids removal. In general, a greater percentage of the solids are removed by the nonionic resins as compared to the ionic resins. Thus, a 25 brix feed solution having a browning index of 10 and a phenol range of about 14 to about 20 mg/ml yields a composition having between 18 and 23 brix, a browning index of about 10, and a phenol range of about 2 to about 12 mg/ml. These treated compositions will have essentially the same capability of browning meats when applied to the meat surface. Solutions of commercially available aqueous smoke with brix values of about 25 to 30 generally have browning index values of about 10 to 12. Feed solutions as low as about 4 brix may be treated to produce useful compositions. Below 4 brix, the feed solution is usually too dilute to provide acceptable compositions.

The application of liquid smoke solutions to meat and other food products can be carried out in a number of ways. Where the characteristic smoked color is desired, spraying or dipping can be done on individual items in a batch or continuous mode. Where large batches are to be processed an atomized cloud of liquid smoke can be employed. Alternatively, sausages and hams may be processed in casings into which liquid smoke solutions have been incorporated. Food products which are typically treated with liquid smoke solutions include meat, poultry and fish

RESIN COMPOSITION DESCRIPTION

Resins suitable for practicing the present invention are known in the art. U.S. Pat. No. 3,531,463, to Gustafson, describes processes for preparing polymeric nonionic resins and using the resins to separate an organic component from an aqueous solution. U.S. Pat. No. 4,297,220, issued Oct. 27, 1981 and 4,224,415, issued Sept. 23, 1980 both to Meitzner, et al. describe water insoluble, macroreticulated adsorptive polymeric resins. These patents generally describe resins useful in the process of the present invention.

The polymeric resins described in U.S. Pat. Nos. 3,531,463, 4,297,220 and 4,224,415 are suspension polymerized copolymers of a monoethylenically unsaturated monomer and a cross-linking polyvinylidene monomer. Suitable monoethylenically unsaturated monomers are alkyl acrylates and alkyl acrylate esters, cycloalkyl acrylates, substituted phenyl acrylates and benzyl acrylate.

Preferably the resin is made of lower alkyl esters of acrylic acid in which the alkyl group contains from one to five carbon atoms.

Copolymers of the above monomers with monovinylene compounds such as dialkyl maleates, dialkyl fumarates, dialkyl crotonate, dialkyl itaconates, and dialkyl glutaconates, are also possible.

Suitable polyvinylidene compounds include unsubstituted and substituted divinylbenzenes and divinylpyridines. Particularly preferred polyvinylidene monomers, commonly known as "cross-linkers", include polyvinylaromatic hydrocarbons, such as divinylbenzene and trivinylbenzene. Glycol dimethacrylates, such as ethylene glycol dimethacrylate, and polyvinyl ethers of polyhydric alcohols, such as divinyloxyethane and trivinyloxypropane are also useful cross-linkers.

If a monovinylaromatic hydrocarbon is used as the monovinylidene monomer, and a divinylaromatic hydrocarbon, such as a divinylbenzene, is used as the polyvinylidene monomer, a cross-linked polystyrene is formed on copolymerization in the presence of a precipitant.

The polymeric resins may be modified by attaching charged or polar groups to the polymer. The type of charged or polar group is selected to provide variable adsorptive properties. The group which is preferred to remove the basic constituents found in aqueous smoke solutions is a sulphonate group.

The polymeric adsorbents are typically hard, insoluble beads which have high porosity and high surface area. A bead will have a nominal mesh size of about 20 to 60 and the polymeric surface can be chemically modified to provide beads having varying polarities and surface characteristics. The resins may be available in other formats, such as gels.

Commercially available nonionic resins are useful to practice this invention. Resins sold by Rohm and Haas under the tradenames XAD-2, XAD-4, XAD-7, XAD-8 and XAD-16 are all suitable adsorptive resins which provide selective removal of phenols from liquid smoke solution. The XAD-4 resin is a preferred resin.

Commercially available ionic resins are also useful to practice this invention. A resins sold by Rohm and Haas under the tradenames Amberlite IR-120 and resins sold by Dow Chemical USA designated XUS-40090.01 and XYS-40032.00 are all suitable ionic resins. These ionic resins all use a sulfonate as the active ionic group and are generally described as strongly acid cationic resins.

REGENERATION OF THE RESIN

The compounds bound by the above described resins can be displaced from the resin under appropriate conditions. The resins are thus regenerated and can be reused.

Regeneration of the ionic resin may be carried out by flushing the column with a 10% sulfuric acid solution.

Regeneration of the nonionic resin may be carried out using a relatively polar solvent. The solvent is chosen such that little affinity for the resin by the solvent exists. Accordingly, solvents with hydrogen bonding solubility parameters greater than about 9.62 are used. Additionally, so that even the small amount of solvents which are subsequently eluted into the treated product can be removed, a solvent with a boiling point less than water is preferred.

The solvents most useful are those which are acceptable for contact with food substances. The solvents of choice are polar organic solvents which are completely soluble in water and with boiling points lower than water, such as ethanol, methanol or acetone.

The following examples are intended to illustrate the present invention and do not limit the scope of the claims.

EXAMPLE I

Example I shows the reduction of phenols content which can be obtained by selective absorption by nonionic resins.

A 7.6 cm diameter glass column was loaded to 15.4 cm high with Rohm & Haas XAD-4 resin. An aqueous smoke solution, CharSol C-10 was passed downflow through the column at a rate of 40 ml/min. Effluent samples were collected every 500 ml beginning when the brix reached 12. The CharSol feed had the following composition:

10.6% acids
14.5 mg/ml phenols
12.6% carbonyls
24.5 brix

The phenols on the effluent samples were determined and the data is shown in Table 1. Solutions with a range of phenols from 2.8 to 13.4 mg/ml were produced.

TABLE I

| 500 ml Portion # | Phenol Value |
| --- | --- |
| 1 | 2.8 |
| 2 | 4.8 |
| 3 | 7.0 |
| 4 | 7.7 |
| 5 | 9.2 |
| 6 | 9.7 |
| 7 | 10.8 |
| 8 | 11.4 |
| 9 | 12.0 |
| 10 | 12.2 |
| 11 | 12.5 |
| 12 | 12.5 |
| 13 | 13.1 |
| 14 | 13.4 |

EXAMPLE II

Example II shows the high browning index which is maintained even with the significant reduction of phenols by treatment of aqueous smoke solutions with nonionic resins.

The 2.8, 4.8 and 10.8 mg/ml phenol samples of Example I were analyzed for acids, carbonyls, phenols, browning index and brix. Results are as follows.

| Phenols Effluent | Acids % w/v | Phenols mg/ml | Carbonyls % w/v | Browning Index | Brix |
| --- | --- | --- | --- | --- | --- |
| Initial | 10.9 | 14.5 | 11.5 | 9.4 | 24.5 |
| 2.8 | 8.8 | 2.8 | 8.5 | 8.4 | 15.5 |
| 4.8 | 10.6 | 4.8 | 9.4 | 10.3 | 19.0 |
| 10.8 | 10.3 | 10.8 | 8.3 | 11.5 | 22.0 |

No significant decrease in browning index on the solutions treated to produce between 4.8 and 10.8 mg/ml phenols. A slight decrease was observed at the 2.8 mg/ml level. This was caused by a dilution effect of beginning to sample at 12 brix. This is known because of the low 8.8% acid value. By interpolating all values back to 10.5 mg/ml phenols, 10.1% carbonyls, 10.0 browning index, 18.5 brix, it can be concluded that no decrease in browning index results from phenol reduction down to at least 3.3 mg/ml phenols.

EXAMPLE III

Example III shows that no decrease in browning index results from treatment with nonionic resins over the entire range of phenol reduction which is possible. Also shown is the maximum amount of aqueous smoke solution which can be processed with a given amount of a particular resin.

A 10.5" diameter column was packed to 45" height with Rohm and Haas XAD-4 resin. CharSol C-10 was passed down flow through the column at about 1400 ml/min. Samples were taken periodically and analyzed for phenols, carbonyls, browning and brix. Results are as follows.

|  | Phenols mg/ml | Carbonyls % | Browning Index | Brix |
| --- | --- | --- | --- | --- |
| CharSol C-10 Feed | 17.0 | 12.4 | 9.9 | 25.9 |
| 10 gal. | 1.3 | 11.3 | 9.6 | 19.2 |
| 20 gal. | 2.4 | 11.1 | 10.1 | 21.0 |
| 30 gal. | 4.8 | 11.5 | 10.6 | 22.6 |
| 40 gal. | 6.3 | 11.5 | 10.4 | 23.2 |
| 50 gal. | 7.9 | 12.2 | 10.3 | 23.4 |
| 65 gal. | 12.5 | 11.8 | 9.5 | 24.4 |
| 75 gal. | 14.3 | NA | NA | 24.6 |
| 85 gal. | 15.3 | 11.3 | 9.5 | 24.6 |
| 95 gal. | 17.0 | NA | NA | 25.4 |
| 105 gal. | 16.8 | 12.6 | 9.3 | 26.0 |

NA = not analyzed

The results show that at about 95 gallons the resin is at maximum through-put capacity, and cannot remove additional phenols.

The results also show that down to 1.3 mg/ml phenols no significant decrease in browning index is observed.

EXAMPLE IV

Example IV shows the batch treatment of aqueous smoke solutions with nonionic resins.

To 100 ml aliquots of CharSol C-10 were added 10, 20, 30 and 40 g portions of Rohm and Haas XAD-4. The samples were mixed on a magnetic stirrer for 1 hour. After separation from the resin by filtration the solutions were separated from the resin and analyzed for phenols. Results are as follows:

| Grams of XAD-4/100 ml c-10 | Phenols mg/ml |
| --- | --- |
| 0 | 14.6 |
| 10 | 9.30 |
| 20 | 6.14 |
| 30 | 4.20 |
| 40 | 3.05 |

The results show the substantial reduction of phenols that can be obtained by batch treatment.

EXAMPLE V

Example V shows a continuing run to the point of resin saturation. The reduced, yet higher total phenols effluent can be used to increase the yield of low total phenols product.

A 36" dia. ×28" high column of Rohm & Haas XAD-4 was washed with acetone. The solvent was removed by passing water upflow through the column until the acetone concentration in the effluent was less than 0.1%.

CharSol C-10 was passed through the column downflow at a rate of 4.5 gpm. The column effluent up to about 8mg/ml total phenols was collected and about 360 gal. of effluent with total phenols concentration of about 12 mg/ml was saved for use as recycle on a subsequent run.

The resin was regenerated by passing about 165 gal. acetone downflow through the column at about 2.4 gpm. The acetone was removed upflow as above.

The 360 gal. CharSol C-10 with 12 mg/ml phenols produced above was passed downflow through the column at about 4.5 gpm. Subsequently, 470 gal. of CharSol C-10 was passed through the column.

About 440 gal. of effluent with a total phenols concentration of 4.0 mg/ml was produced.

EXAMPLE VI

Example VI shows the improved flavor which can be achieved by treatment of aqueous smoke solutions with nonionic resins.

The resin treated product prepared as in Example V with a total phenolic concentration of 5.3 mg/ml was evaluated in a triangular taste panel against a CharSol C-10 with a total phenols concentration of 14.5 mg/ml. Panelists were asked to taste 100 ppm tap water solutions of each flavoring. Four of five panelists correctly distinguished the odd sample and all indicated that the CharSol C-10 had a stronger smoke flavor than the treated product.

It was concluded that a substantial flavor reduction had been achieved with the nonionic resin phenol reduction treatment.

Smoke solutions treated with nonionic resins to reduce the total phenols concentration to about 2 mg/ml are also useful to flavor and color foodstuffs.

CharSol C-10 was treated with XAD-4 as in Example V. The resulting phenols concentration was about 2.1 mg/ml.

The phenol reduced CharSol C-10 and the as-is CharSol C-10 were applied to weiners as follows. Wieners were made from a pork and beef formulation at Chermak Sausage Company, Manitowoc, Wis. Stuffing was done in 25 mm diameter cellulose casings. Batches of about 20 wieners were dipped in aqueous smoke solutions diluted to 40% with water. Dip times were one minute.

The wieners were processed according to the following schedule:

| Time (Minutes) | Temperature (°F.) |
| --- | --- |
| 60 | 140 |
| 15 | 160 |
| 20 | 180 (160 internal) |
| 15 | Shower to Cool |

The wieners were peeled, vacuum packaged and stored at 36° F. prior to tasting. Both the control and reduced phenol composition treated wieners had equally desirable smoked color.

A triangular taste panel was run to determine if there was a difference between the treated and control samples. Wieners were steamed in an electric skillet for approximately eight minutes and wieners cut into approximately 1 cm long pieces and the panelists were asked to pick the odd sample from the three samples they were given. Two treated and one control sample were used. Of eleven panelists, six correctly determined the odd sample. All six indicated that the control had stronger smoke flavor than the treated sample.

Results indicate the utility of producing a mild flavored wiener by using an aqueous smoke solution having phenols reduced to about 2 mg/ml.

Smoke solutions treated with nonionic resins to reduce the total phenols concentration to about 12 mg/ml are also useful to flavor and color foodstuffs.

CharSol C-10 was treated with XAD-4 as in Example V. The resulting phenols concentration was 11.8 mg/ml.

Wieners were prepared and evaluated as above. Seven of eleven panelists correctly determined the odd sample.

These results indicate the utility of producing a mild flavored wiener by using an aqueous smoke solution having phenols reduced to about 12 mg/ml.

EXAMPLE VII

Example VII shows the upper concentration limit of feed stocks on which the reduction of phenols can be achieved with nonionic resins.

The following solutions were passed downflow through a 1" dia. ×4" high column of Rohm and Haas XAD-4 resin at 14 ml/min:

|  | Acids (%) | Phenols (mg/ml) | Brix | Description |
|---|---|---|---|---|
| CharSol C-10 | 10.6 | 14.0 | 24.9 | Aqueous smoke solution |
| CharSol C-12 | 12.6 | 20.5 | 27.5 | Aqueous smoke solution |
| CharSol Supreme | 15.7 | 36.6 | 44.5 | Evaporatively concentrated CharSol C-10 |

After reaching 12 brix, 30 ml effluent samples were taken and subsequently analyzed for total phenols. The data is shown in Table 2.

The data shows that the resin effectively removed phenols from the two untreated solutions. However, the high brix evaporatively concentrated solution was not substantially phenol reduced. The total organics concentration in solutions above about 40 brix exerts stronger forces on the phenols than does the resin, thereby making the resin unable to substantially reduce the total phenols concentration.

TABLE 2

| Sample | Phenol Value | | |
|---|---|---|---|
| | C-10 | C-12 | Supreme |
| 1 | 4.1 | 5.8 | 15.2 |
| 2 | 5.2 | 8.7 | 22.0 |
| 3 | 6.2 | 10.3 | 28.6 |
| 4 | 7.0 | 11.5 | 28.6 |
| 5 | 8.4 | 12.4 | 29.2 |
| 6 | 9.5 | 14.0 | 28.6 |

TABLE 2-continued

| Sample | Phenol Value | | |
|---|---|---|---|
| | C-10 | C-12 | Supreme |
| 7 | 10.4 | 14.5 | |
| 8 | 12.0 | 15.0 | |
| 9 | 12.2 | 15.8 | |
| 10 | 12.0 | 16.6 | |

EXAMPLE VIII

Examples VIII is an example showing different adsorption profiles for different types of resins used. The exemplified resins can be used to practice the process claimed in this invention and all give resin treated liquid smoke compositions within the scope of this invention.

A 50 cc column of approximately 1 inch diameter ×4 inches high was used to treat CHarSOl C-10. The solution was flowed through the column at approximately 13 ml/min. Effluent samples were taken every 30 ml after initially reading 12 brix. The samples were analyzed for total phenol and are presented in Table 6.

The data shows that the resins XAD-2 and XAD-7 are about as effective as the XAD-4 in phenol reduction of aqueous smoke solutions.

TABLE 3

| Sample | XAD-2 | XAD-4 | XAD-7 |
|---|---|---|---|
| 1 | 5.3 | 4.1 | 3.4 |
| 2 | 8.8 | 5.2 | 6.1 |
| 3 | 9.7 | 6.2 | 8.8 |
| 4 | 10.8 | 7.0 | 9.7 |
| 5 | 12.0 | 8.4 | 11.4 |
| 6 | 12.5 | 9.5 | 12.0 |
| 7 | 12.2 | 10.4 | 12.5 |
| 8 | 12.5 | 12.0 | 12.8 |
| 9 | 12.5 | 12.2 | 13.1 |
| 10 | 12.5 | 12.0 | 13.1 |

EXAMPLE IX

Example IX shows the effect of strongly acid cation exchange resins on the sensory perceptions of aqueous liquid smoke adjusted to the pH of meat surfaces. CharSol LF, a reduced flavor aqueous liquid smoke is run through a column containing Dow XYS40032.00, a strongly acidic cation exchange resin. Samples are adjusted to pH 5.5 and evaluated by olfactory perception. The following data was obtained:

| EXPERIMENTAL PARAMETERS: | | |
|---|---|---|
| 50 cc Resin | 500 cc Samples | 10 cc/Minute Flow Rate |

TABLE 4

| Sample | Sensory Evaluation |
|---|---|
| 1 | A |
| 2 | A |
| 3 | A |
| 4 | A |
| 5 | A |
| 6 | A |
| 7 | A |
| 8 | B |
| 9 | B |
| 10 | B |
| 11 | B |
| 12 | B |
| 13 | B |
| 14 | C |

TABLE 4-continued

| Sample | Sensory Evaluation |
|---|---|
| 15 | C |

Where:
A = Little or no mustiness in aroma.
B = Slight mustiness in aroma, but less than starting material.
C = Level mustiness equal to starting material.

When evaluated by olfactory perception, sample 1–7 generally have little or none of the musty, earthy aroma compared to the starting material. Samples 8–13 have some hint of mustiness in the aroma, but less than the starting material. Samples after 13 have a level of mustiness in the aroma equal to the starting material. A ratio of 70 parts aqueous liquid smoke to one part strong acid cation exchange resin removes practically all of the undesirable mustiness from the aroma of the smoke, while a ratio of 130 parts liquid smoke to one part resin produces a smoke with some mustiness, but one that is still sensually acceptable.

EXAMPLE X

Example X shows the effect the brix of the starting material has on the amount of aqueous liquid smoke that can be passed through a given quantity of a strongly acid cation exchange resin before its capacity to remove basic compounds declines. CharSols C3, LF, and Cs, aqueous smoke flavorings having brix values of 8.1, 19.8, and 42.5 respectively, are passed through a column containing Dow XYS-40032.00, a strong acid cation exchange resin for the purpose of removing basic compounds. Samples are adjusted to pH 5.5 and evaluated by olfactory perception. The following data was obtained:

| Experimental Parameters: | | |
|---|---|---|
| 50 cc Resin | 500 cc Samples | 10 cc/minute |

TABLE 5

| | Olfactory Perception | | |
|---|---|---|---|
| Sample | 8.1 Brix Feed | 19.8 Brix Feed | 42.5 Brix Feed |
| 1 | A | A | A |
| 2 | A | A | A |
| 3 | A | A | B |
| 4 | A | A | B |
| 5 | A | A | B |
| 6 | A | A | C |
| 7 | A | A | C |
| 8 | A | B | C |
| 9 | A | B | C |
| 10 | A | B | C |
| 11 | A | B | C |
| 12 | A | B | C |
| 13 | A | B | C |
| 14 | A | C | C |
| 15 | B | C | C |
| 16 | B | C | C |
| 17 | B | C | C |
| 18 | B | C | C |
| 19 | B | C | C |
| 20 | B | C | C |
| 21 | B | C | C |
| 22 | B | C | C |
| 23 | C | C | C |
| 24 | C | C | C |
| 25 | C | C | C |

Where:
A = Little or no mustiness in aroma.
B = Some hint of mustiness in aroma, but less than starting material.
C = Level of mustiness equal to starting material.

| | Ratio cc Liquid Smoke/cc Resin | |
|---|---|---|
| Feed Brix | "A" Product | "B" Product |
| 8.1 | 140:1 | 220:1 |
| 19.8 | 70:1 | 130:1 |
| 42.5 | 20:1 | 50:1 |

The data shows that the brix of the starting material has a direct bearing on the quantity of sensually acceptable aqueous smoke that can be produced from a given amount of cation exchange resin. The higher the brix of the starting feed, the faster the ion exchange resin becomes exhausted.

EXAMPLE XI

Example XI shows the sensual properties of aqueous smoke exposed to different types of cation exchange resins. CharSol LF, a reduced flavor aqueous liquid smoke, is passed through columns containing both Dow XYS-40032.00, a strongly acidic cation exchange resin, and Rohm and Haas Amberlite DP-1, a weakly acidic cation exchange resin, to see which is better at removing basic compounds. Samples are adjusted to pH 5.5 and evaluated by olfactory perception. The following data is obtained:

| Experimental Parameters: | | |
|---|---|---|
| 50 cc Resin | 500 cc Samples | 10 cc/minute flow rate |

TABLE 6

| | Olfactory Perception | |
|---|---|---|
| Sample | Strong Acid Resin | Weak Acid Resin |
| 1 | A | C |
| 2 | A | C |
| 3 | A | C |
| 4 | A | C |
| 5 | A | C |
| 6 | A | C |
| 7 | A | C |
| 8 | A | C |
| 9 | A | C |
| 10 | B | C |
| 11 | B | C |
| 12 | B | C |
| 13 | B | C |
| 14 | C | C |
| 15 | C | C |

Where:
A = Little or no mustiness in aroma.
B = Some hint of mustiness in aroma, but less than starting material.
C = Level of mustiness in aroma equal to starting material.

the data shows that the weak acid cation exchange resin removes virtually none of the basic components that are responsible for musty, earthy tones in the aroma of pH adjusted aqueous smoke. The strong acid cation exchange is preferred.

ANALYTICAL PROCEDURES

The techniques used to analyze liquid smoke compositions are known. The acids in liquid smoke are measured as titratable acidity calculated as acetic acid. The procedure for determining phenols is a modified Gibbs method which measures phenols as 2,6-dimethoxyphenol and is described in Tucker, I. W. "Estimation of Phenols in Meat and Fat", JAOAC, XXV, 779 (1942). The procedure for determining carbonyls is a modified Lappan-Clark method which measures carbonyls as 2-butanone and is described in "Colorimetric Method for Determination of Traces of Carbonyl Compounds", Anal. Chem. 23, 541-542 (1959). Both procedures for determining carbonyls and phenols are fully described in U.S. Pat. No. 4,431,032, the disclosure of which is herein incorporated by reference.

The procedures used to determine the browning index of a sample are described in U.S. Pat. Application Ser. No. 774,871, the relevant portions which are herein incorporated by reference. The browning index is a relative measure of the ability of carbonyls to react with the amino acid, glycine. Tests have shown good correlation between the browning index values of a solution of smoke flavoring and the extent of brown color formation on meat surfaces.

I claim:

1. A process for making a high browning, reduced flavor liquid smoke composition comprising the step of:
    contacting an aqueous liquid smoke solution of about 4 to 40 brix with both a polymeric nonionic resin and a polymeric ion resin to produce a composition having reduced phenol and basic constituents, a browning index from about 8 to about 12, and a phenol content of about 2 to about 12 mg/ml.

2. A process according to claim 1 wherein contact of the aqueous liquid smoke solution with both of said resins occurs simultaneously.

3. The process according to claim 1 wherein said contact with said resins occurs sequentially, wherein said aqueous solution first contacts said ionic resin and then said nonionic resin.

4. The process according to claim 1 wherein said contact with said resins occurs sequentially, wherein said aqueous solution first contacts said nonionic resin and then said ionic resin.

5. A process according to claim 1 wherein contact of the aqueous liquid smoke solution with the resins is effected by passing the aqueous liquid smoke solution through a bed of said resins.

6. The process according to claim 1 wherein said contact occurs by stirring said resins with said aqueous liquid smoke solution and filtering said resins from said composition after sufficient contact time.

7. A process according to claim 1 wherein the polymeric nonionic resin comprises cross-linked copolymers of monoethylenically unsaturated monomer and about 2 to 100 weight percent of at least one polyvinylidene monomer polymerized in suspension and the polymeric ionic resin comprises ionic groups attached to cross-linked copolymers of monomethylenically unsaturated monomer and about 2 to 100 weight percent of at least one polyvinylidene monomer polymerized in suspension.

8. An edible food product comprising: a proteinaceous food substrate and a water soluble liquid extract produced according to the process of claim 1.

9. An aqueous liquid smoke composition consisting essentially of phenols, carbonyls, acids, neutral and basic constituents, wherein said phenols content are reduced about 10 to about 90 weight percent by contacting said aqueous solution with a nonionic resin and said basic constituents are reduced an effective amount by contacting said aqueous solution with an ionic resin.

10. A liquid smoke composition according to claim 9 having a phenol contact of about 2 to about 12 mg/ml, a browning index of about 8 to about 12, and is about 15 to about 25 brix.

11. A liquid smoke composition according to claim 10 having a phenol content of about 2 to about 12 mg/ml, a browning index of about 10, and is about 18 to about 23 brix.

12. A process for flavoring an edible foodstuff comprising the steps of:
    contacting an aqueous liquid smoke solution of about 4 to 40 brix with both a polymeric nonionic resin and a polymeric ionic resin to produce a composition having reduced phenol and basic constituents, a browning index of about 8 to about 12, and a phenol content of about 2 to about 12 mg/ml; and
    contacting an edible foodstuff with the liquid smoke composition.

13. An edible foodstuff according to claim 12 wherein said foodstuff is selected from the group consisting of meat, poultry and fish.

14. A process for coloring an edible foodstuff comprising the steps of:
    contacting an aqueous liquid smoke solution of about 4 to 40 brix with both a polymeric nonionic resin and a polymeric ionic resin to produce a composition having reduced phenol and basic constituents, a browning index of about 8 to about 12, and a phenol content of about 2 to about 12 mg/ml; and
    contacting an edible foodstuff with the liquid smoke composition.

15. A process according to claim 14 for flavoring and coloring an edible foodstuff comprising the steps of:
    contacting an aqueous liquid smoke solution of about 4 to 40 brix with both a polymeric nonionic resin and a polymeric ionic resin to produce a composition having reduced phenol and basic constituents, a browning index of about 8 to about 12, and a phenol content of about 2 to about 12 mg/ml; and
    contacting an edible foodstuff with the liquid smoke composition.

16. A process for making a high browning, reduced flavor liquid smoke composition comprising the step of:
    contacting an aqueous liquid smoke solution of about 4 to 40 brix with a polymeric nonionic resin to produce a composition having a browning index of about 8 to about 12, and a phenol content of about 2 to about 12 mg/ml.

17. The process according to claim 16 wherein said contact occurs by flowing said aqueous liquid smoke solution through a column of said resin.

18. An aqueous liquid smoke composition consisting essentially of phenols, carbonyls, acids, neutral and basic constituents, wherein said phenols content is reduced about 10 to about 90 weight percent by contacting said aqueous liquid smoke with a nonionic resin.

19. A process for producing a high browning, reduced flavor liquid smoke composition comprising:
    contacting an aqueous liquid smoke solution of about 4 to 40 brix with an amount of polymeric ionic resin effective to selectively remove musty, earthy aromatic basic constituents from said solution.

* * * * *

UNITED STATES PATENT AND TRADEMARK OFFICE
CERTIFICATE OF CORRECTION

PATENT NO. : 4,959,232

DATED : September 25, 1990

INVENTOR(S) : Underwood

It is certified that error appears in the above-identified patent and that said Letters Patent is hereby corrected as shown below:

Col. 2, line 38, after the word "color" insert --.--;

Col. 3, line 4, change ".033" to --'033--;

Col. 3, line 8, change ".033" to --'033--;

Col. 3, line 55, after the word "resin" insert --.--;

Col. 4, line 20, after the word "methods" insert --.--;

Col. 4, line 58, after the word "fish" insert --.--;

Col. 7, line 25, before the word "follows" insert --as--;

Col. 8, line 7, insert a space between "x" and "28";

Col. 9, line 37, insert a space between "x" and "4";

Col. 10, line 17, insert a space between "x" and "4";

Col. 10, line 45, change "XYS40032.00" to --XYS-40032.00--;

UNITED STATES PATENT AND TRADEMARK OFFICE
CERTIFICATE OF CORRECTION

PATENT NO. : 4,959,232
DATED : September 25, 1990
INVENTOR(S) : Underwood

It is certified that error appears in the above-identified patent and that said Letters Patent is hereby corrected as shown below:

Col. 11, line 9, change "sample" to --samples--;

Col. 12, line 41, change "8   A    C" to --8    B    C--;

Col. 12, line 42, change "9   A    C" to --9    B    C--;

Col. 12, line 53, change "the" to --The--;

Claim 1, line 21, change "ion" to --ionic--;

Claim 10, line 2, change "contact" --content--.

Signed and Sealed this

Fourth Day of August, 1992

Attest:

DOUGLAS B. COMER

*Attesting Officer*    Acting Commissioner of Patents and Trademarks